United States Patent
Park et al.

(10) Patent No.: US 11,067,168 B2
(45) Date of Patent: Jul. 20, 2021

(54) POWER TRANSMISSION APPARATUS FOR VEHICLE

(71) Applicants: Hyundai Motor Company, Seoul (KR); Kia Motors Corporation, Seoul (KR)

(72) Inventors: Juhyeon Park, Uiryeong-Eup (KR); Seong Wook Hwang, Gunpo-Si (KR); Seongwook Ji, Gunpo-Si (KR); Ki Tae Kim, Incheon (KR); Wonmin Cho, Hwaseong-Si (KR); Hyun Sik Kwon, Seoul (KR); Ilhan Yoo, Hwaseong-Si (KR); Sun Sung Kwon, Anyang-Si (KR); Chon Ok Kim, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 175 days.

(21) Appl. No.: 16/596,193

(22) Filed: Oct. 8, 2019

(65) Prior Publication Data
US 2020/0355266 A1 Nov. 12, 2020

(30) Foreign Application Priority Data

May 8, 2019 (KR) .......................... 10-2019-0053470

(51) Int. Cl.
*F16H 3/00* (2006.01)
*F16H 61/32* (2006.01)
(Continued)

(52) U.S. Cl.
CPC ............... *F16H 61/32* (2013.01); *F16H 1/46* (2013.01); *F16H 37/06* (2013.01); *F16H 2003/007* (2013.01)

(58) Field of Classification Search
CPC . F16H 3/006; F16H 61/32; F16H 1/46; F16H 37/06
(Continued)

(56) References Cited

U.S. PATENT DOCUMENTS 8,323,142 B2 12/2012 Masumoto
10,451,152 B2 * 10/2019 Hwang ............... F16H 37/0833
(Continued)

FOREIGN PATENT DOCUMENTS

EP 3 121 483 A1 1/2017

*Primary Examiner* — Ha Dinh Ho
(74) *Attorney, Agent, or Firm* — Morgan, Lewis & Bockius LLP

(57) ABSTRACT

A power transmission apparatus configured for a vehicle, may include a first input shaft selectively connectable to an engine output shaft, a second input shaft mounted coaxial with the first input shaft and selectively connectable to the engine output shaft, a third input shaft external to the second input shaft and selectively connectable to the engine output shaft, a torque mediating shaft mounted coaxial with the first input shaft, first and second intermediate shafts, an idle shaft, a first shifting section including five gear sets, the first and second intermediate shafts, the torque mediating shaft and the idle shaft, a second shifting section including a planetary gear set having a sun gear fixedly connected to the torque mediating shaft, and an output shaft mounted coaxial with and selectively connectable to the first intermediate shaft and outputting a torque from the first and second shifting sections.

20 Claims, 8 Drawing Sheets

(51) Int. Cl.
*F16H 1/46* (2006.01)
*F16H 37/06* (2006.01)

(58) Field of Classification Search
USPC .................................. 74/330, 331, 665 R
See application file for complete search history.

(56) References Cited

U.S. PATENT DOCUMENTS

| | | | |
|---|---|---|---|
| 10,549,623 B1 * | 2/2020 | Park | B60K 6/40 |
| 10,668,797 B2 * | 6/2020 | Chae | F16H 3/725 |
| 10,766,352 B2 * | 9/2020 | Park | F16H 3/006 |
| 11,002,339 B2 * | 5/2021 | Jang | F16H 3/006 |
| 2013/0031990 A1 | 2/2013 | Singh et al. | |

* cited by examiner

FIG. 2

| Shift-stage | CL1 | CL2 | CL3 | CL4 | B1 | SN1 | | | SN2 | | |
|---|---|---|---|---|---|---|---|---|---|---|---|
| | | | | | | SG1 | N | SG2 | SG4 | N | SG3 |
| REV | | | ● | ● | | ○ | ● | ○ | | | ● |
| FD1 | ● | | | ● | | ● | | | ○ | ● | ○ |
| FD2 | | | ● | ● | | ○ | ● | ○ | ● | | |
| FD3 | ● | | | ● | | | | ● | ○ | ● | ○ |
| FD4 | | ● | | ● | | ○ | ● | ○ | ○ | ● | ○ |
| FD5 | ● | ● | | | | | | ● | ○ | ● | ○ |
| FD6 | | ● | ● | | | ○ | ● | ○ | ● | | |
| FD7 | ● | ● | | | | ● | | | ○ | ● | ○ |
| FD8 | | ● | ● | | | ○ | ● | ○ | | | ● |

○ : Preliminary engagement available

FIG. 4

| Shift-stage | CL1 | CL2 | CL3 | CL4 | B1 | SN1 | | | SN2 | | |
|---|---|---|---|---|---|---|---|---|---|---|---|
| | | | | | | SG1 | N | SG2 | SG4 | N | SG3 |
| REV | | | ● | ● | | ○ | ● | ○ | | | ● |
| FD1 | ● | | | ● | | ● | | | ○ | ● | ○ |
| FD2 | | | ● | ● | | ○ | ● | ○ | ● | | |
| FD3 | ● | | | ● | | | | ● | ○ | ● | ○ |
| FD4 | | ● | | ● | | ○ | ● | ○ | ○ | ● | ○ |
| FD5 | ● | ● | | | | | | ● | ○ | ● | ○ |
| FD6 | | ● | ● | | | ○ | ● | ○ | ● | | |
| FD7 | ● | ● | | | | ● | | | ○ | ● | ○ |
| FD8 | | ● | | | ● | ○ | ● | ○ | ○ | ● | ○ |
| FD9 | | ● | ● | | | ○ | ● | ○ | | | ● |

○ : Preliminary engagement available

FIG. 6

| | Shift-stage | CL1 | CL2 | CL3 | CL4 | B1 | SN1 | | | SN2 | | |
|---|---|---|---|---|---|---|---|---|---|---|---|---|
| | | | | | | | SG1 | N | SG2 | SG4 | N | SG3 |
| Engine mode / Parallel mode | REV | | | ● | ● | | ○ | ● | ○ | | | ● |
| | FD1 | ● | | | ● | | ● | | | ○ | ● | ○ |
| | FD2 | | | ● | ● | | ○ | ● | ○ | ● | | |
| | FD3 | ● | | | ● | | | | ● | ○ | ● | ○ |
| | FD4 | | ● | | ● | | ○ | ● | ○ | ○ | ● | ○ |
| | FD5 | ● | ● | | | | | | ● | ○ | ● | ○ |
| | FD6 | | ● | ● | | | ○ | ● | ○ | ● | | |
| | FD7 | ● | ● | | | | ● | | | ○ | ● | ○ |
| | FD8 | | ● | | | ● | ○ | ● | ○ | ○ | ● | ○ |
| | FD9 | | ● | ● | | | ○ | ● | ○ | | | ● |
| e-CVT | FD | | ● | | | | ○ | ● | ○ | ○ | ● | ○ |
| EV mode | FD/REV | | | | ● | | ○ | ● | ○ | ○ | ● | ○ |

○ : Preliminary engagement available

FIG. 8

| | Shift-stage | ECL | CL1 | CL2 | CL3 | CL4 | B1 | SN1 | | | SN2 | | |
|---|---|---|---|---|---|---|---|---|---|---|---|---|---|
| | | | | | | | | SG1 | N | SG2 | SG4 | N | SG3 |
| Engine mode / Parallel mode | REV | ● | | | ● | ● | | ○ | ● | ○ | | | ● |
| | FD1 | ● | ● | | | ● | | ● | | | ○ | ● | ○ |
| | FD2 | ● | | | ● | ● | | ○ | ● | ○ | ● | | |
| | FD3 | ● | ● | | | ● | | | | ● | ○ | ● | ○ |
| | FD4 | ● | | ● | | ● | | ○ | ● | ○ | ○ | ● | ○ |
| | FD5 | ● | ● | ● | | | | | | ● | ○ | ● | ○ |
| | FD6 | ● | | | ● | ● | | ○ | ● | ○ | ● | | |
| | FD7 | ● | ● | ● | | | | ● | | | ○ | ● | ○ |
| | FD8 | ● | | ● | | | ● | ○ | ● | ○ | ○ | ● | ○ |
| | FD9 | ● | | ● | ● | | | ○ | ● | ○ | | | ● |
| EV mode | REV | | | | ● | ● | | ○ | ● | ○ | | | ● |
| | FD1 | | ● | | | ● | | ● | | | ○ | ● | ○ |
| | FD2 | | | | ● | ● | | ○ | ● | ○ | ● | | |
| | FD3 | | ● | | | ● | | | | ● | ○ | ● | ○ |
| | FD4 | | | ● | | ● | | ○ | ● | ○ | ○ | ● | ○ |
| | FD5 | | ● | ● | | | | | | ● | ○ | ● | ○ |
| | FD6 | | | ● | ● | | | ○ | ● | ○ | ● | | |
| | FD7 | | ● | ● | | | | ● | | | ○ | ● | ○ |
| | FD8 | | | ● | | | ● | ○ | ● | ○ | ○ | ● | ○ |
| | FD9 | | | ● | ● | | | ○ | ● | ○ | | | ● |

○ : Preliminary engagement available

POWER TRANSMISSION APPARATUS FOR VEHICLE

CROSS-REFERENCE TO RELATED APPLICATION

The present application claims priority to Korean Patent Application No. 10-2019-0053470 filed on May 8, 2019, the entire contents of which is incorporated herein for all purposes by this reference.

BACKGROUND OF THE INVENTION

Field of the Invention

The present invention relates to a power transmission apparatus for a vehicle. More particularly, the present invention relates to a power transmission apparatus for a vehicle for realizing multiple shifting stages by adding one planetary gear set in a dual clutch transmission structure and achieving the vehicle to run in an electric vehicle mode and a parallel hybrid mode by adding one motor/generator.

Description of Related Art

An environmentally-friendly technology of a vehicle is a core technology which controls survival of a future vehicle industry, and advanced vehicle makers have focused their energy on the development of an environmentally-friendly vehicle to achieve environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such a future vehicle technology.

The dual-clutch transmission (DCT) may include two clutch devices and a gear train of a manual transmission. The DCT selectively transmits torque input from an engine to two input shafts through two clutches, changes the torque selectively transmitted to the two input shafts through the gear train, and outputs the changed torque.

The DCT is used to realize a compact transmission achieving a forward speed higher than a fifth forward speed. The DCT is used as an automated manual transmission that does not require a driver's manual manipulation by controlling two clutches and synchronizing devices by a controller.

Compared with an automatic transmission with planetary gear sets, the DCT has excellent power delivery efficiency, simplifies change and addition of components for achieving multiple gear stages, and improves fuel economy.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a power transmission apparatus configured for a vehicle having advantages of realizing multiple shifting stages by adding one planetary gear set in a dual clutch transmission structure and achieving the vehicle to run in an engine driving mode, an electric vehicle mode and a parallel hybrid mode by adding one motor/generator, simplifying its internal structure by reducing the number of components, improving fuel economy by minimizing the weight, and improve the mountability by reducing the volume.

A power transmission apparatus configured for a vehicle according to one or a plurality of exemplary embodiments of the present invention may include a first input shaft selectively connectable to an engine output shaft, a second input shaft formed as a hollow shaft, mounted coaxial with and external to the first input shaft without rotational interference therebetween, and selectively connectable to the engine output shaft, a third input shaft formed as a hollow shaft, mounted coaxial with and external to the second input shaft, and selectively connectable to the engine output shaft, a torque mediating shaft formed as a hollow shaft and mounted coaxial with and external to the first input shaft without rotational interference therebetween, first and second intermediate shafts mounted in parallel with the first input shaft, an idle shaft mounted in parallel with the second intermediate shaft, a first shifting section including five gear sets mounted on the first and third input shafts, the first and second intermediate shafts, the torque mediating shaft and the idle shaft, and the first shifting section selectively receiving a torque from the first and third input shafts, shifting the received torque and outputting the shifted torque, a second shifting section including a planetary gear set having a sun gear fixedly connected to the torque mediating shaft, and the second shifting section selectively receiving torques from the first shifting section and the second input shaft and outputting shifted torque through one gear set, and an output shaft mounted coaxial with and selectively connectable to the first intermediate shaft and outputting a torque from the first and second shifting sections;

The first shifting section may include a first gear set including a first input gear fixedly connected to the first input shaft, and a first shifting gear rotatably mounted to the first intermediate shaft and externally gear-meshed with the first input gear, a second gear set including a second input gear fixedly connected to the first input shaft, and a second shifting gear rotatably mounted to the first intermediate shaft and externally gear-meshed with the second input gear, a third gear set including a third input gear fixedly connected to the third input shaft, and a first external gear fixedly connected to the second intermediate shaft and externally gear-meshed with the third input gear, a fourth gear set including a third shifting gear rotatably mounted to the second intermediate shaft, and a first idle gear fixedly connected to the idle shaft and externally gear-meshed with the third shifting gear, and a fifth gear set including a fourth shifting gear rotatably mounted to the second intermediate shaft, a second external gear fixedly connected to the torque mediating shaft and externally gear-meshed with the fourth shifting gear, a second idle gear fixedly connected to the idle shaft and externally gear-meshed with the second external gear, and a third external gear fixedly connected to the first intermediate shaft and externally gear-meshed with the second external gear.

The power transmission apparatus may further include a first synchronizer selectively synchronously connecting the first shifting gear or the second shifting gear to the first intermediate shaft, and a second synchronizer selectively synchronously connecting the third shifting gear or the fourth shifting gear to the second intermediate shaft.

A gear ratio of the first gear set may be used for the first forward speed and the seventh forward speed, a gear ratio of the second gear set may be used for the third forward speed and the fifth forward speed, gear ratios of the third and fourth gear sets may be used for the eighth forward speed, and gear ratios of the third and fifth gear sets may be for the second forward speed and the sixth forward speed.

A planet carrier of the planetary gear set may be fixedly connected to the second input shaft and a ring gear of the planetary gear set may be externally gear-meshed with the output shaft through a sixth gear set.

The sixth gear set may include a fourth external gear fixedly connected to the ring gear of the planetary gear set, and a fifth external gear fixedly connected to the output shaft and externally gear-meshed with the fourth external gear.

The planetary gear set may be a single pinion planetary gear set.

The power transmission apparatus may further include four clutches each of which facilitating selective connection.

The four clutches may include a first clutch mounted between the engine output shaft and the first input shaft, a second clutch mounted between the engine output shaft and the second input shaft, a third clutch mounted between the engine output shaft and the third input shaft, and a fourth clutch mounted between the first intermediate shaft and the output shaft.

The second shifting section and the first shifting section may be mounted in a listed order from an opposite side of the engine output shaft.

The power transmission apparatus may further include a brake mounted between the first intermediate shaft and a transmission housing.

A gear ratio of the first gear set may be used for the first forward speed and the seventh forward speed, a gear ratio of the second gear set may be used for the third forward speed and the fifth forward speed, gear ratios of the third and fourth gear sets may be used for the ninth forward speed and the reverse speed, and gear ratios of the third and fifth gear sets may be for the second forward speed and the sixth forward speed.

The power transmission apparatus may further include a brake mounted between the first intermediate shaft and a transmission housing, and a motor/generator externally gear-meshed with the idle shaft.

The power transmission apparatus may further include a fourth input gear fixedly connected to a motor shaft of the motor/generator and externally gear-meshed with the second idle gear fixedly mounted on the idle shaft.

The fifth gear set may further include the fourth input gear. A gear ratio of the first gear set may be used for the first forward speed and the seventh forward speed, a gear ratio of the second gear set may be used for the third forward speed and the fifth forward speed, gear ratios of the third and fourth gear sets may be used for the ninth forward speed and the reverse speed, and gear ratios of the third and fifth gear sets may be for the second forward speed and the sixth forward speed.

The power transmission apparatus may further include a brake mounted between the first intermediate shaft and a transmission housing, and a motor/generator selectively connectable to the engine output shaft.

A rotor of the motor/generator may be selectively connectable to the engine output shaft through an engine clutch mounted between the rotor and the engine output shaft.

A gear ratio of the first gear set may be used for the first forward speed and the seventh forward speed, a gear ratio of the second gear set may be used for the third forward speed and the fifth forward speed, gear ratios of the third and fourth gear sets may be used for the ninth forward speed and the reverse speed, and gear ratios of the third and fifth gear sets may be for the second forward speed and the sixth forward speed.

A rotor of the motor/generator may be selectively connectable to the first, second, and third input shafts through a first, second, and third clutches, respectively.

A power transmission apparatus configured for a vehicle according to various exemplary embodiments of the present invention may realize eight forward speeds and one reverse speed by adding one planetary gear set in a dual clutch transmission structure and simplify its internal structure by reducing the number of components, improving fuel economy by minimizing the weight, and improve the mountability by reducing the volume.

A power transmission apparatus configured for a vehicle according to various exemplary embodiments of the present invention may realize nine forward speeds and one reverse speed by further adding one brake to the power transmission apparatus configured for a vehicle according to the various exemplary embodiments of the present.

A power transmission apparatus configured for a vehicle according to various exemplary embodiments of the present invention may realize e-CVT mode by further adding one motor/generator to the power transmission apparatus configured for a vehicle according to the various exemplary embodiments of the present.

A power transmission apparatus configured for a vehicle according to various exemplary embodiments of the present invention may realize an electric vehicle mode and a parallel hybrid mode by changing a position of the motor/generator of the power transmission apparatus configured for a vehicle according to the various exemplary embodiments of the present.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a shifting operation chart for a power transmission apparatus configured for a vehicle according to various exemplary embodiments of the present invention.

FIG. 4 is a shifting operation chart for a power transmission apparatus configured for a vehicle according to various exemplary embodiments of the present invention.

FIG. 6 is a shifting operation chart for a power transmission apparatus configured for a vehicle according to various exemplary embodiments of the present invention.

FIG. 8 is a shifting operation chart for a power transmission apparatus configured for a vehicle according to various exemplary embodiments of the present invention.

Figure 1:
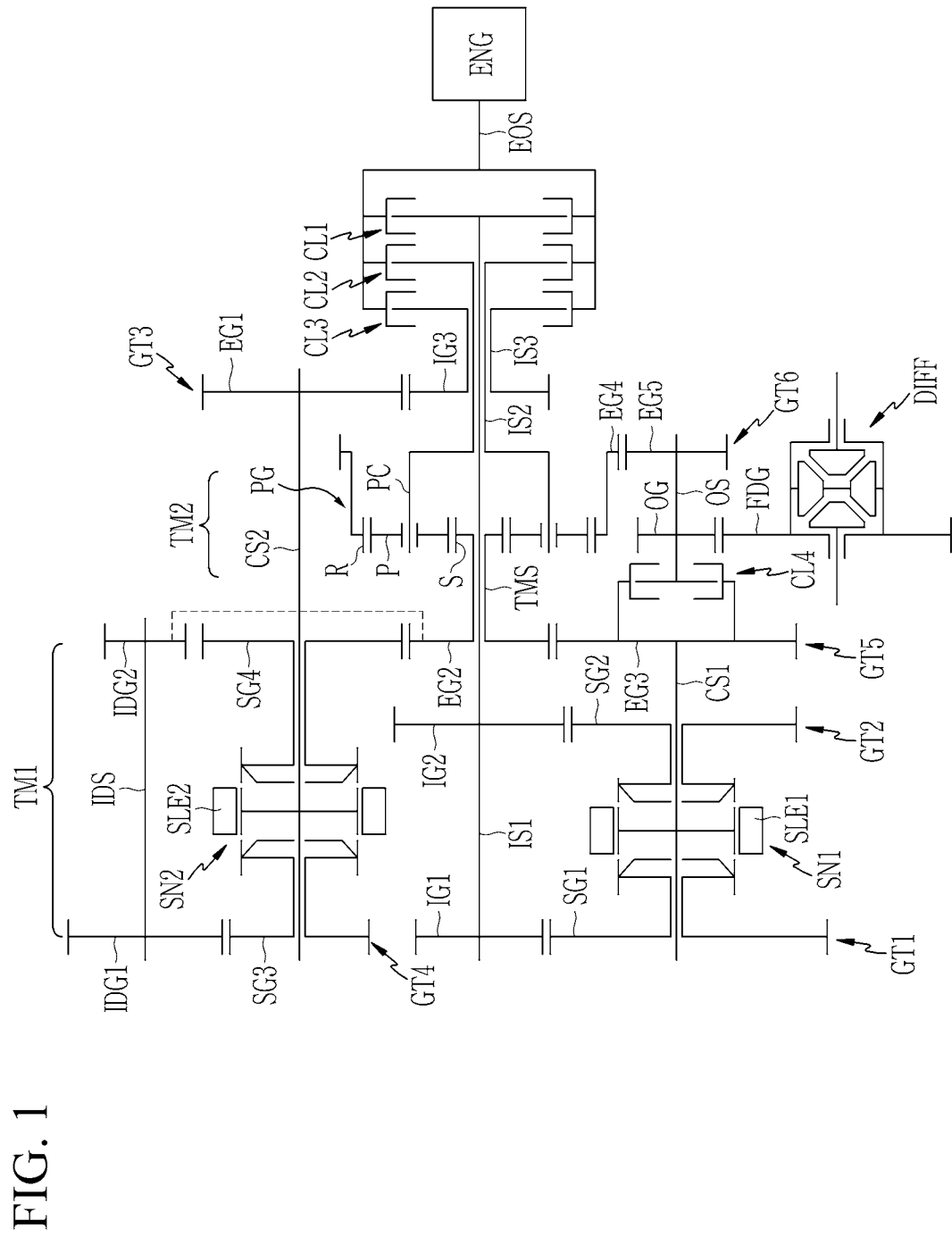
FIG. 1 is a schematic view of a power transmission apparatus configured for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic view of a power transmission apparatus configured for a vehicle according to an exemplary embodiment of the present invention.

Referring to FIG. 1, a power transmission apparatus configured for a vehicle according to various exemplary embodiments of the present invention may include an engine ENG first, second, and third input shafts IS1, IS2, and IS3, a torque mediating shaft TMS, first and second intermediate shafts CS1 and CS2, an idle shaft IDS, first and second shifting sections TM1 and TM2 and an output shaft OS.

The engine ENG is a primary power source and a variety of typical engines such as a gasoline engine or a diesel engine that utilizes fossil fuel may be used as the engine ENG.

A torque from the engine ENG is shifted into a plurality of fixed shifting stages in the first shifting section TM1, and a torque selectively transmitted from the engine ENG through the second input shaft IS2 and the first shifting section TM1 are shifted into a plurality of shifting stages in the second shifting section TM2 and output through the output shaft OS.

The first, second, third input shaft IS1, IS2, and IS3 and the torque mediating shaft TMS are coaxially mounted and the first and second intermediate shafts CS1 and CS2, the output shaft OS and the idle shaft IDS are parallel with the first, second, third input shaft IS1, IS2, and IS3 and the torque mediating shaft TMS and the first intermediate shaft CS1 and the output shaft OS are coaxially mounted and selectively connectable to each other.

The first input shaft IS1 is selectively connectable to the engine output shaft EOS and the first input shaft IS1 receives the torque of the engine ENG and selectively transmits to the first intermediate shaft CS1 of the first shifting section TM1.

The second input shaft IS2 is formed as a hollow shaft, coaxially and externally mounted with the first input shaft IS1 without rotational interference therebetween, and selectively connectable to the engine output shaft EOS for transferring the torque of the engine ENG to the second shifting section TM2.

The third input shaft IS3 is formed as a hollow shaft, coaxially and externally mounted with the second input shaft IS2 without rotational interference therebetween, and selectively connectable to the engine output shaft EOS for transferring the torque of the engine ENG to the second intermediate shaft CS2 of the first shifting section TM1

The torque mediating shaft TMS is formed as a hollow shaft and coaxially and externally mounted with the first input shaft IS1 without rotational interference therebetween.

The first shifting section TM1 includes first, second, third fourth, and fifth gear sets GT1, GT2, GT3, GT4 and GT5 mounted on the first and third input shafts IS1 and IS3, the first and second intermediate shafts CS1 and CS2, the idle shaft IDS, and the torque mediating shaft TMS.

The second shifting section TM2 includes a planetary gear set PG including three rotation elements and the planetary gear set PG is a single pinion planetary gear set. The planetary gear set PG includes a sun gear S, a planet carrier PC rotatably supporting a plurality of pinion gears P externally gear-meshed with the sun gear S, and a ring gear R internally gear-meshed with the plurality of pinion gears P.

The planetary gear set PG is mounted between the second input shaft IS2 and the torque mediating shaft TMS. The sun gear S is fixedly connected to the torque mediating shaft TMS, the planet carrier PC is fixedly connected to the second input shaft IS2, and the ring gear R is external gear connected to the output shaft OS through a sixth gear set GT6.

The first gear set GT1 includes a first input gear IG1 fixedly connected to the first input shaft IS1, and a first shifting gear SG1 mounted coaxial with and external to the first intermediate shaft CS1 and externally gear-meshed with the first input gear IG1.

The second gear set GT2 includes a second input gear IG2 fixedly connected to the first input shaft IS1, and a second shifting gear SG2 mounted coaxial with and external to the first intermediate shaft CS1 and externally gear-meshed with the second input gear IG2.

The third gear set GL3 includes a third input gear IG3 fixedly connected to the third input shaft IS3, and a first external gear EG1 fixedly connected to the second intermediate shaft CS2 and externally gear-meshed with the third input gear IG3.

The fourth gear set GT4 includes a third shifting gear SG3 mounted coaxial with and external to the second intermediate shaft CS2, and a first idle gear IDG1 fixedly connected to the idle shaft IDS and externally gear-meshed with the third shifting gear SG3.

The fifth gear set GT5 includes a fourth shifting gear SG4, a second external gear EG2, a second idle gear IDG2, and a third external gear EG3. The fourth shifting gear SG4 is mounted coaxial with and external to the second intermediate shaft CS2. The second external gear EG2 is fixedly connected to the torque mediating shaft TMS and externally gear-meshed with the fourth shifting gear SG4. The second idle gear IDG2 is fixedly connected to the idle shaft IDs and externally gear-meshed with the second external gear EG2 and the third external gear EG3 is fixedly connected to the first intermediate shaft CS1 and externally gear-meshed with the second external gear EG2.

The sixth gear set GT6 includes a fourth external gear EG4 fixedly connected to the ring gear R of the planetary gear set PG and a fifth external gear EG5 fixedly connected to the output shaft OS and externally gear-meshed with the fourth external gear EG4.

A first synchronizer SN1 selectively synchronously connects the first shifting gear SG1 or the second shifting gear SG2 to the first intermediate shaft CS1.

A second synchronizer SN2 selectively synchronously connects the third shifting gear SG3 or the fourth shifting gear SG4 to the second intermediate shaft CS2.

Gear ratios of the first, second, third, fourth, fifth, and sixth gear sets GT1, GT2, GT3, GT4, GT5 and GT6 may be set according to design factors such as engine and vehicle specifications. According to the various exemplary embodiments of the present invention, a gear ratio of the first gear set GT1 is used for the first forward speed and the seventh forward speed, a gear ratio of the second gear set GT2 is used for the third forward speed and the fifth forward speed, gear ratios of the third and fourth gear sets GT3 and GT4 are used for the eighth forward speed, and gear ratios of the third and fifth gear sets GT3 and GT5 are for the second forward speed and the sixth forward speed.

The output shaft OS receives torques input from the fifth gear set GT5 and the sixth gear set GL6 and transmits the received torque to a differential DIFF through the output gear OG and the final reduction gear FDG.

Furthermore, first to fourth clutches CL1, CL2, CL3, and CL4 are mounted between rotation members such as various shafts.

The first clutch CL1 is mounted between the engine output shaft EOS (i.e., engine crankshaft) and the first input shaft IS1 and selectively connects the engine output shaft EOS and first input shaft IS1.

The second clutch CL2 is mounted between the engine output shaft EOS and the second input shaft IS2 and selectively connects the engine output shaft EOS and the second input shaft IS2.

The third clutch CL3 is mounted between the engine output shaft EOS and the third input shaft IS3 and selectively connects the engine output shaft EOS and the third input shaft IS3.

The fourth clutch CL4 is mounted between the first intermediate shaft CS1 and the output shaft OS and selectively connects the first intermediate shaft CS1 and the output shaft OS.

The engagement elements the first, second, third and fourth clutches CL1, CL2, CL3 and CL4 may be realized as multi-plate hydraulic pressure friction devices that are frictionally engaged by hydraulic pressure, however, it may not be understood to be limited thereto, since various other configuration that are electrically controllable may be available.

In the disclosure, when two or more members are described to be "fixedly connected", where the member may be any of a shaft, an input shaft, an output shaft, a rotation member, and a transmission housing, it means that the fixedly connected members always rotate at a same speed. That is, rotation elements and/or shafts fixedly interconnected rotate in a same rotating direction and at a same rotation speed.

When two or more members are described to be "selectively connectable" by an engagement element, it means that the selectively connectable members rotate separately when the engagement element is not engaged, and rotates at a same speed when the engagement element is engaged. It may be understood that in the case that a member is "selectively connectable" with a transmission housing by an engagement element, the member may be stationary when the engagement element is engaged.

The first and second synchronizers SN1 and SN2 may be formed as a known scheme, and the first and second sleeves SLE1 and SLE2 applied to the first and second synchronizers SN1 and SN2 may be operated by respective actuators which may be controlled by a transmission control unit.

The second shifting section TM2 and the first shifting section TM1 are mounted in a listed order from an opposite side of the engine output shaft EOS.

FIG. 2 is a shifting operation chart for a power transmission apparatus configured for a vehicle according to the various exemplary embodiments of the present invention, and the power transmission apparatus configured for a vehicle according to the various exemplary embodiments performs shifting operation as follows.

[Reverse Speed]

In reverse speed REV as shown in FIG. 2, the second intermediate shaft CS2 and the third shifting gear SG3 are synchronously connected by the sleeve SLE2 of the second synchronizer SN2 and the third and fourth clutches CL3 and CL4 are simultaneously operated.

The torque of engine ENG is transferred to the idle shaft IDS passing through the engine output shaft EOS, the third input shaft IS3, the third gear set GT3, the second intermediate shaft CS2, the second synchronizer SN2, and the fourth gear set GT4 by the operations of the third clutch CL3 and the second synchronizer SN2.

And the torque of the idle shaft IDS is transmitted to the differential DIFF through the fifth gear set GT5 and the output shaft OS by the operation of the fourth clutch CL4, realizing the reverse speed REV.

[The First Forward Speed]

In the first forward speed FD1, as shown in FIG. 2, the first intermediate shaft CS1 and the first shifting gear SG1 are synchronously connected by the operation of the sleeve SLE1 of the first synchronizer SN1 and the first and fourth clutches CL1 and CL4 are operated simultaneously.

As such, by the operation of the first clutch CL1 and the first synchronizer SN1, the torque of the engine ENG is transmitted to the first intermediate shaft CS1 while passing through the engine output shaft EOS, the first input shaft IS1, the first gear set GT1, and the first synchronizer SN1.

And the torque of the first intermediate shaft CS1 is transmitted to the differential DIFF through the output shaft OS by the operation of the fourth clutch CL4, realizing the first forward speed FD1.

[The Second Forward Speed]

In the second forward speed FD2, as shown in FIG. 2, the second intermediate shaft CS2 and the fourth shifting gear SG4 are synchronously connected by the operation of the sleeve SLE2 of the second synchronizer SN2 and the third and fourth clutches CL3 and CL4 are operated simultaneously.

As such, by the operations of the third clutch CL3 and the second synchronizer SN2, the torque of the engine ENG is transmitted to the first intermediate shaft CS1 while passing through the engine output shaft EOS, the third input shaft IS3, the third gear set GT3, the second synchronizer SN2, the second intermediate shaft CS2, and the fifth gear set GT5.

And the torque of the first intermediate shaft CS1 is transmitted to the differential DIFF through the output shaft OS by the operation of the fourth clutch CL4, realizing the second forward speed FD2.

[The Third Forward Speed]

In the third forward speed FD3, as shown in FIG. 2, the second intermediate shaft CS2 and the first shifting gear SG1 are synchronously connected by the operation the sleeve SLE1 of the first synchronizer SN1, and the first and fourth clutches CL1 and CL4 are operated simultaneously.

As such, by the operation of the first clutch CL1 and the first synchronizer SN1, the torque of the engine ENG is transmitted to the first intermediate shaft CS1 while passing through the engine output shaft EOS, the first input shaft IS1, the second gear set GT2, and the first synchronizer SN1.

And the torque of the first intermediate shaft CS1 is transmitted to the differential DIFF through the output shaft OS by the operation of the fourth clutch CL4, realizing the third forward speed FD3.

[The Fourth Forward Speed]

In the fourth forward speed FD4, as shown in FIG. 2, while the first and second synchronizers SN1 and SN2 are in neutral state, the second and fourth clutches CL2 and CL4 are operated simultaneously.

As such, by the operations of the second clutch CL2, the torque of the engine ENG is transmitted to the planet carrier PC of the planetary gear set PG through the second input shaft IS2.

Furthermore, while the planetary gear set PG receives an input torque through the planet carrier PC, the fifth gear set GT5, the first intermediate shaft CS1, the output shaft OS, the sixth gear set GT6, the torque mediating shaft TMS are interconnected by the operation of the fourth clutch CL4. Therefore, the planetary gear set PG forms a closed torque loop between the sun gear S and the ring gear R, and outputs the torque of the planet carrier PC to the differential DIFF through the output shaft OS, realizing the fourth forward speed FD4.

[The Fifth Forward Speed]

In the fifth forward speed FD5, as shown in FIG. 2, the second intermediate shaft CS2 and the first shifting gear SG1 are synchronously connected by the operation the sleeve SLE1 of the first synchronizer SN1, and the first clutch and second clutch CL1 and CL2 are operated simultaneously.

As a result, by the operation of the first clutch CL1 and the first synchronizer SN1, the torque of the engine ENG partially passes through the first input shaft IS1, the second gear set GT2, the first synchronizer SN1, first the intermediate shaft CS1, and fifth gear set GT5, and is transmitted to the sun gear S of the planetary gear set PG.

Furthermore, by the operation of the second clutch CL2, the torque of the engine ENG partially passes through the second input shaft IS2, and is transmitted to the planet carrier PC of the planetary gear set PG.

As such, the planetary gear set PG forms a shifted torque by a rotation speed difference between the sun gear S and the planet carrier PC, and outputs the shifted toque to the differential DIFF through the output shaft OS, realizing the fifth forward speed FD5.

[The Sixth Forward Speed]

In the sixth forward speed FD6, as shown in FIG. 2, the second intermediate shaft CS2 and the fourth shifting gear SG4 are synchronously connected by the operation of the sleeve SLE2 of the second synchronizer SN2 and the second and third clutches CL2 and CL3 are operated simultaneously.

As a result, by the operation of the second clutch CL2, the torque of the engine ENG partially passes through the second input shaft IS2, and is transmitted to the planet carrier PC of the planetary gear set PG.

Furthermore, by the operation of the third clutch CL3 and the second synchronizer SN2, the torque of the engine ENG partially passes through the third input shaft IS3, the third gear set GT3, the second intermediate shaft CS2, the second synchronizer SN2, and the fifth gear set GT5, and is transmitted to the sun gear S of the planetary gear set PG.

As such, the planetary gear set PG forms a shifted torque by a rotation speed difference between the sun gear S and the planet carrier PC, and outputs the shifted toque to the differential DIFF through the output shaft OS, realizing the sixth forward speed FD6.

[The Seventh Forward Speed]

In the seventh forward speed FD7, as shown in FIG. 2, the first intermediate shaft CS1 and the first shifting gear SG1 are synchronously connected by the operation of the sleeve SLE1 of the first synchronizer SN1 and the first clutch and second clutch CL1 and CL2 are operated simultaneously.

As a result, by the operation of the first clutch CL1 and the first synchronizer SN1, the torque of the engine ENG partially passes through the first input shaft IS1, the first gear set GT1, the first synchronizer SN1, the first intermediate shaft CS1, the fifth gear set GT5, and the torque mediating shaft TMS, and is transmitted to the sun gear S of the planetary gear set PG.

Furthermore, by the operation of the second clutch CL2, the torque of the engine ENG partially passes through the second input shaft IS2, and is transmitted to the planet carrier PC of the planetary gear set PG.

As such, the planetary gear set PG forms a shifted torque by a rotation speed difference between the sun gear S and the planet carrier PC, and outputs the shifted toque to the differential DIFF through the output shaft OS, realizing the seventh forward speed FD7.

[The Eighth Forward Speed]

In the eighth forward speed FD8, as shown in FIG. 2, the second intermediate shaft CS2 and the third shifting gear SG3 are synchronously connected by the sleeve SLE2 of the second synchronizer SN2 and the second and third clutches CL2 and CL3 are simultaneously operated.

As a result, by the operation of the second clutch CL2, the torque of the engine ENG partially passes through the second input shaft IS2, and is transmitted to the planet carrier PC of the planetary gear set PG.

Furthermore, by the operation of the third clutch CL3, the torque of the engine ENG partially passes through the third input shaft IS3, the third gear set GT3, the second intermediate shaft CS2, the second synchronizer SN2, the fourth gear set GT4, the idle shaft IDS, and the fifth gear set GT5, and is transmitted to the sun gear S of the planetary gear set PG reversely.

As such, the planetary gear set PG outputs an increased speed though the ring gear R and the output torque of the ring gear R is transmitted through the sixth gear set GT6 and the output shaft OS to the differential DIFF, realizing the eighth forward speed FD8.

That is, the sun gear S reversely rotates and the torque of the engine ENG is input to the planet carrier PC, so that the increased rotation speed than in the seventh forward speed is realized.

Figure 3:
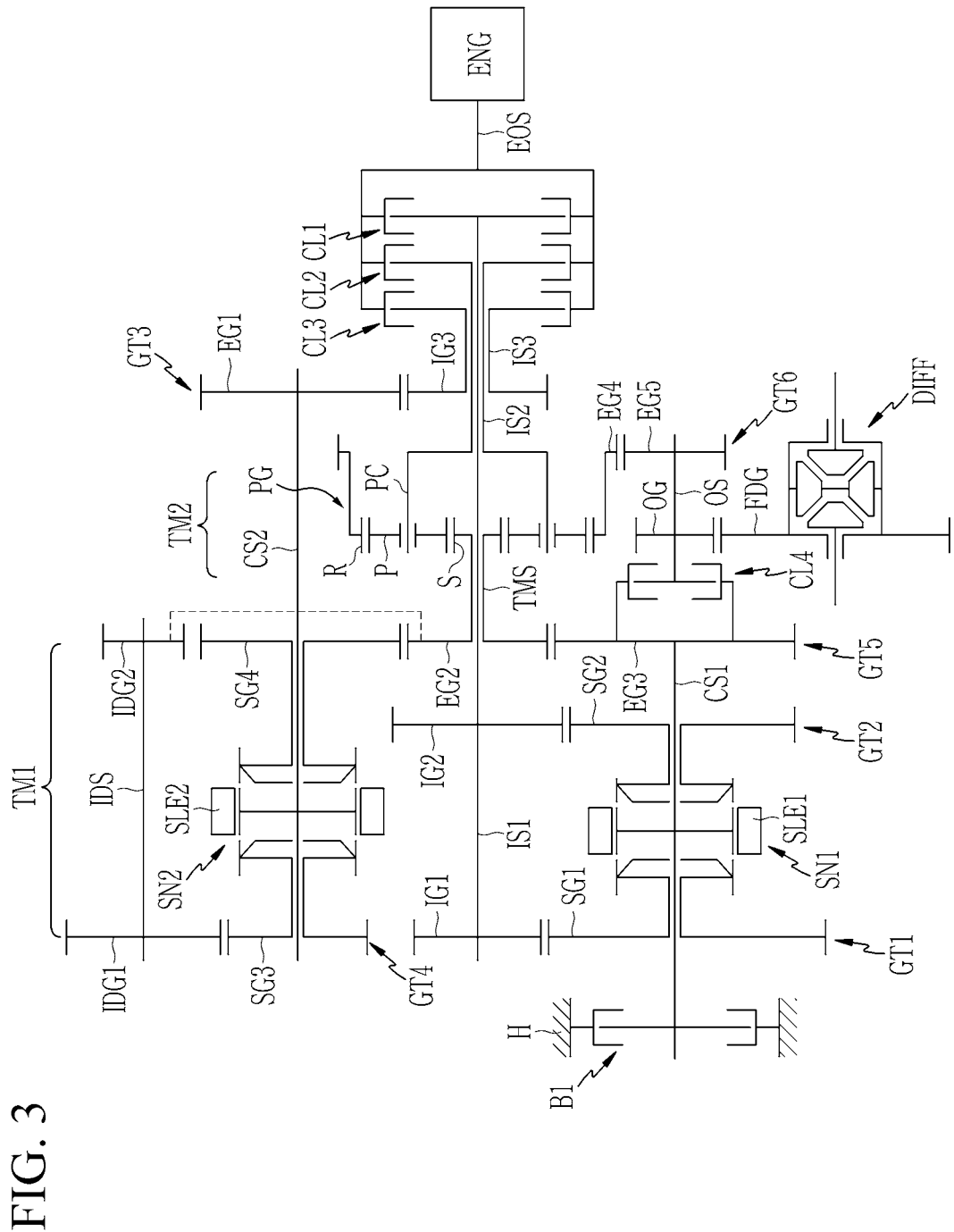
FIG. 3 is a schematic view of a power transmission apparatus configured for a vehicle according to various exemplary embodiments of the present invention.

FIG. 3 is a schematic view of a power transmission apparatus configured for a vehicle according to various exemplary embodiments of the present invention.

Referring to FIG. 3, in various exemplary embodiments of the present invention, a brake B1 is mounted between the first intermediate shaft CS1 and transmission housing H in comparison with the various exemplary embodiments of the present invention, nine forward speeds and one reverse speed may be realized.

The various exemplary embodiments only differ from the various exemplary embodiments in adding the brake B1, providing the same shafting operation and effect, which is therefore not described in further detail.

The brake B1 may be realized as multi-plate hydraulic pressure friction device which is frictionally engaged by hydraulic pressure, however, it may not be understood to be limited thereto, since various other configuration that are electrically controllable may be available.

FIG. 4 is a shifting operation chart for a power transmission apparatus configured for a vehicle according to the various exemplary embodiments of the present invention, and the power transmission apparatus configured for a vehicle according to the various exemplary embodiments performs shifting operation as follows.

[Reverse Speed]

In reverse speed REV as shown in FIG. 4, the second intermediate shaft CS2 and the third shifting gear SG3 are synchronously connected by the sleeve SLE2 of the second synchronizer SN2 and the third and fourth clutches CL3 and CL4 are simultaneously operated.

The torque of engine ENG is transferred to the idle shaft IDS passing through the engine output shaft EOS, the third input shaft IS3, the third gear set GT3, the second intermediate shaft CS2, the second synchronizer SN2, and the fourth gear set GT4 by the operations of the third clutch CL3 and the second synchronizer SN2.

And the torque of the idle shaft IDS is transmitted to the differential DIFF through the fifth gear set GT5 and the output shaft OS by the operation of the fourth clutch CL4, realizing the reverse speed REV.

[The First Forward Speed]

In the first forward speed FD1, as shown in FIG. 4, the first intermediate shaft CS1 and the first shifting gear SG1 are synchronously connected by the operation of the sleeve SLE1 of the first synchronizer SN1 and the first and fourth clutches CL1 and CL4 are operated simultaneously.

As such, by the operation of the first clutch CL1 and the first synchronizer SN1, the torque of the engine ENG is transmitted to the first intermediate shaft CS1 while passing through the engine output shaft EOS, the first input shaft IS1, the first gear set GT1, and the first synchronizer SN1.

And the torque of the first intermediate shaft CS1 is transmitted to the differential DIFF through the output shaft OS by the operation of the fourth clutch CL4, realizing the first forward speed FD1.

[The Second Forward Speed]

In the second forward speed FD2, as shown in FIG. 4, the second intermediate shaft CS2 and the fourth shifting gear SG4 are synchronously connected by the operation of the sleeve SLE2 of the second synchronizer SN2 and the third and fourth clutches CL3 and CL4 are operated simultaneously.

As such, by the operations of the third clutch CL3 and the second synchronizer SN2, the torque of the engine ENG is transmitted to the first intermediate shaft CS1 while passing through the engine output shaft EOS, the third input shaft IS3, the third gear set GT3, the second synchronizer SN2, the second intermediate shaft CS2, and the fifth gear set GT5.

And the torque of the first intermediate shaft CS1 is transmitted to the differential DIFF through the output shaft OS by the operation of the fourth clutch CL4, realizing the second forward speed FD2.

[The Third Forward Speed]

In the third forward speed FD3, as shown in FIG. 4, the second intermediate shaft CS2 and the first shifting gear SG1 are synchronously connected by the operation the sleeve SLE1 of the first synchronizer SN1, and the first and fourth clutches CL1 and CL4 are operated simultaneously.

As such, by the operation of the first clutch CL1 and the first synchronizer SN1, the torque of the engine ENG is transmitted to the first intermediate shaft CS1 while passing through the engine output shaft EOS, the first input shaft IS1, the second gear set GT2, and the first synchronizer SN1.

And the torque of the first intermediate shaft CS1 is transmitted to the differential DIFF through the output shaft OS by the operation of the fourth clutch CL4, realizing the third forward speed FD3.

[The Fourth Forward Speed]

In the fourth forward speed FD4, as shown in FIG. 4, while the first and second synchronizers SN1 and SN2 are in neutral state, the second and fourth clutches CL2 and CL4 are operated simultaneously.

As such, by the operations of the second clutch CL2, the torque of the engine ENG is transmitted to the planet carrier PC of the planetary gear set PG through the second input shaft IS2.

Furthermore, while the planetary gear set PG receives an input torque through the planet carrier PC, the fifth gear set GT5, the first intermediate shaft CS1, the output shaft OS, the sixth gear set GT6, the torque mediating shaft TMS are interconnected by the operation of the fourth clutch CL4. Therefore, the planetary gear set PG forms a closed torque loop between the sun gear S and the ring gear R, and outputs the torque of the planet carrier PC to the differential DIFF through the output shaft OS, realizing the fourth forward speed FD4.

[The Fifth Forward Speed]

In the fifth forward speed FD5, as shown in FIG. 4, the second intermediate shaft CS2 and the first shifting gear SG1 are synchronously connected by the operation the sleeve SLE1 of the first synchronizer SN1, and the first clutch and second clutch CL1 and CL2 are operated simultaneously.

As a result, by the operation of the first clutch CL1 and the first synchronizer SN1, the torque of the engine ENG partially passes through the first input shaft IS1, the second gear set GT2, the first synchronizer SN1, first the intermediate shaft CS1, and fifth gear set GT5, and is transmitted to the sun gear S of the planetary gear set PG.

Furthermore, by the operation of the second clutch CL2, the torque of the engine ENG partially passes through the second input shaft IS2, and is transmitted to the planet carrier PC of the planetary gear set PG.

As such, the planetary gear set PG forms a shifted torque by a rotation speed difference between the sun gear S and the planet carrier PC, and outputs the shifted toque to the differential DIFF through the output shaft OS, realizing the fifth forward speed FD5.

[The Sixth Forward Speed]

In the sixth forward speed FD6, as shown in FIG. 4, the second intermediate shaft CS2 and the fourth shifting gear SG4 are synchronously connected by the operation of the sleeve SLE2 of the second synchronizer SN2 and the second and third clutches CL2 and CL3 are operated simultaneously.

As a result, by the operation of the second clutch CL2, the torque of the engine ENG partially passes through the second input shaft IS2, and is transmitted to the planet carrier PC of the planetary gear set PG.

Furthermore, by the operation of the third clutch CL3 and the second synchronizer SN2, the torque of the engine ENG partially passes through the third input shaft IS3, the third gear set GT3, the second intermediate shaft CS2, the second synchronizer SN2, and the fifth gear set GT5, and is transmitted to the sun gear S of the planetary gear set PG.

As such, the planetary gear set PG forms a shifted torque by a rotation speed difference between the sun gear S and the planet carrier PC, and outputs the shifted toque to the differential DIFF through the output shaft OS, realizing the sixth forward speed FD6.

[The Seventh Forward Speed]

In the seventh forward speed FD7, as shown in FIG. 4, the first intermediate shaft CS1 and the first shifting gear SG1 are synchronously connected by the operation of the sleeve SLE1 of the first synchronizer SN1 and the first clutch and second clutch CL1 and CL2 are operated simultaneously.

As a result, by the operations of the first clutch CL1 and the first synchronizer SN1, the torque of the engine ENG partially passes through the first input shaft IS1, the first gear set GT1, the first synchronizer SN1, the first intermediate shaft CS1, the fifth gear set GT5, and the torque mediating shaft TMS, and is transmitted to the sun gear S of the planetary gear set PG.

Furthermore, by the operation of the second clutch CL2, the torque of the engine ENG partially passes through the second input shaft IS2, and is transmitted to the planet carrier PC of the planetary gear set PG.

As such, the planetary gear set PG forms a shifted torque by a rotation speed difference between the sun gear S and the planet carrier PC, and outputs the shifted toque to the differential DIFF through the output shaft OS, realizing the seventh forward speed FD7.

[The Eighth Forward Speed]

In the eighth forward speed FD8, as shown in FIG. 4, while the first and second synchronizers SN1 and SN2 are in neutral state, the second clutch CL2 and the brake B1 are operated simultaneously.

As such, by the operation of the second clutch CL2, the torque of the engine ENG is transmitted to the planet carrier PC of the planetary gear set PG through the second input shaft IS2, and by the operation of the brake B1 the sun gear S of the planetary gear set PG connected to the brake B1 though the first intermediate shaft CS1, the fifth gear set GT5, and the torque mediating shaft TMS acts as a fixed element.

Furthermore, while the planetary gear set PG receives an input torque through the planet carrier PC, the sun gear S of the planetary gear set PG acts as a fixed element by the operation of the brake BK1. Thus, the planetary gear set PG outputs an increased speed through the ring gear R to the differential DIFF, realizing the eighth forward speed FD8.

[The Ninth Forward Speed]

In the ninth forward speed FD9, as shown in FIG. 4, the second intermediate shaft CS2 and the third shifting gear SG3 are synchronously connected by the sleeve SLE2 of the second synchronizer SN2 and the second and third clutches CL2 and CL3 are simultaneously operated.

As a result, by the operation of the second clutch CL2, the torque of the engine ENG partially passes through the second input shaft IS2, and is transmitted to the planet carrier PC of the planetary gear set PG.

Furthermore, by the operation of the third clutch CL3, the torque of the engine ENG partially passes through the third input shaft IS3, the third gear set GT3, the second intermediate shaft CS2, the second synchronizer SN2, the fourth gear set GT4, the idle shaft IDS, and the fifth gear set GT5, and is transmitted to the sun gear S of the planetary gear set PG reversely.

As such, the planetary gear set PG outputs an increased speed though the ring gear R and the output torque of the ring gear R is transmitted through the sixth gear set GT6 and the output shaft OS to the differential DIFF, realizing the ninth forward speed FD9.

That is, the sun gear S reversely rotates and the torque of the engine ENG is input to the planet carrier PC, so that the increased rotation speed than in the eighth forward speed is realized.

In the various exemplary embodiments of the present invention, the eighth forward speed where the brake B1 is operated is added in comparison with the various exemplary embodiments of the present invention, nine forward speeds and one reverse speed may be realized.

Figure 5:
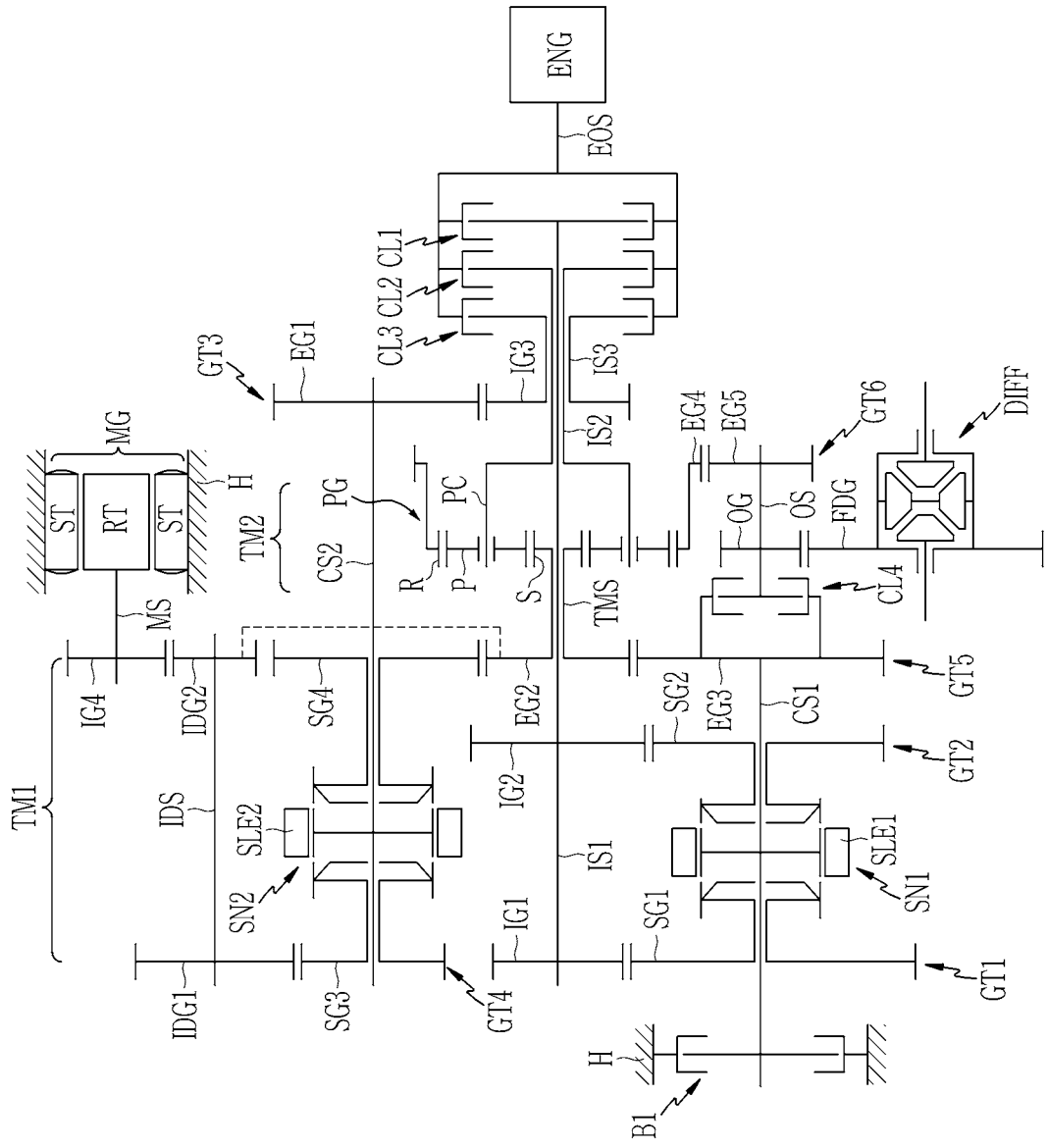
FIG. 5 is a schematic view of a power transmission apparatus configured for a vehicle according to various exemplary embodiments of the present invention.

FIG. 5 is a schematic view of a power transmission apparatus configured for a vehicle according to various exemplary embodiments of the present invention.

Referring to FIG. 5 in various exemplary embodiments of the present invention, a motor/generator MG as an auxiliary power source is added in comparison with the various exemplary embodiments of the present invention, fixed nine forward speeds and one reverse speed, an e-CVT mode and an electric vehicle (EV) mode may be realized.

The motor/generator MG may act as a motor and also as a generator, and may include a stator ST and a rotor RT, where the stator ST is fixed to the transmission housing H and the rotor RT is rotatably supported within the stator ST.

A fourth input gear IG4 fixedly connected to a motor shaft MS of the motor/generator MG is external gear connected to the second idle gear IDG2 on the idle shaft IDS.

FIG. 6 is a shifting operation chart for a power transmission apparatus configured for a vehicle according to the various exemplary embodiments of the present invention, and the power transmission apparatus configured for a vehicle according to the various exemplary embodiments performs shifting operation as follows.

In the various exemplary embodiments of the present invention, since fixed nine forward speeds and one reverse speed are realized as described in the various exemplary embodiments of the present invention, and thus detailed description of the fixed nine forward speeds and one reverse speed will be omitted.

[e-CVT Mode]

In the e-CVT mode, as shown in FIG. 6, while the first and second synchronizers SN1 and SN2 are in neutral state, the second clutch CL2 is operated.

As such, by the operations of the second clutch CL2, the torque of the engine ENG is transmitted to the planet carrier PC of the planetary gear set PG through the second input shaft IS2, and the torque of the motor/generator MG is transmitted to the sun gear S of the planetary gear set PG through the fifth gear set GT5 and the torque mediating shaft TMS.

As such, the planetary gear set PG forms a shifted torque by a rotation speed difference between the sun gear S and the planet carrier PC, and outputs the shifted toque to the differential DIFF through the output shaft OS, realizing the e-CVT mode.

At the present time, the rotational power of the motor/generator MG is controllable so that the engine can operate at the optimum efficiency operating point.

[EV Mode]

In the EV mode, as shown in FIG. 6, while the engine ENG stops and the first and second synchronizers SN1 and SN2 are in neutral state, the fourth clutch CL4 is operated.

As such, the torque of the motor/generator MG is transmitted to the first intermediate shaft CS1 through the fifth gear set GT5, and by the operation of the fourth clutch CL4, the torque transmitted to the first intermediate shaft CS1 is transmitted to the differential DIFF through the output shaft OS, realizing the EV mode.

At the present time, when the motor/generator MG rotates in the forward direction thereof, the forward running may be performed, and when the motor/generator MG rotates in the reverse direction thereof, the reverse running travel may be performed.

Figure 7:
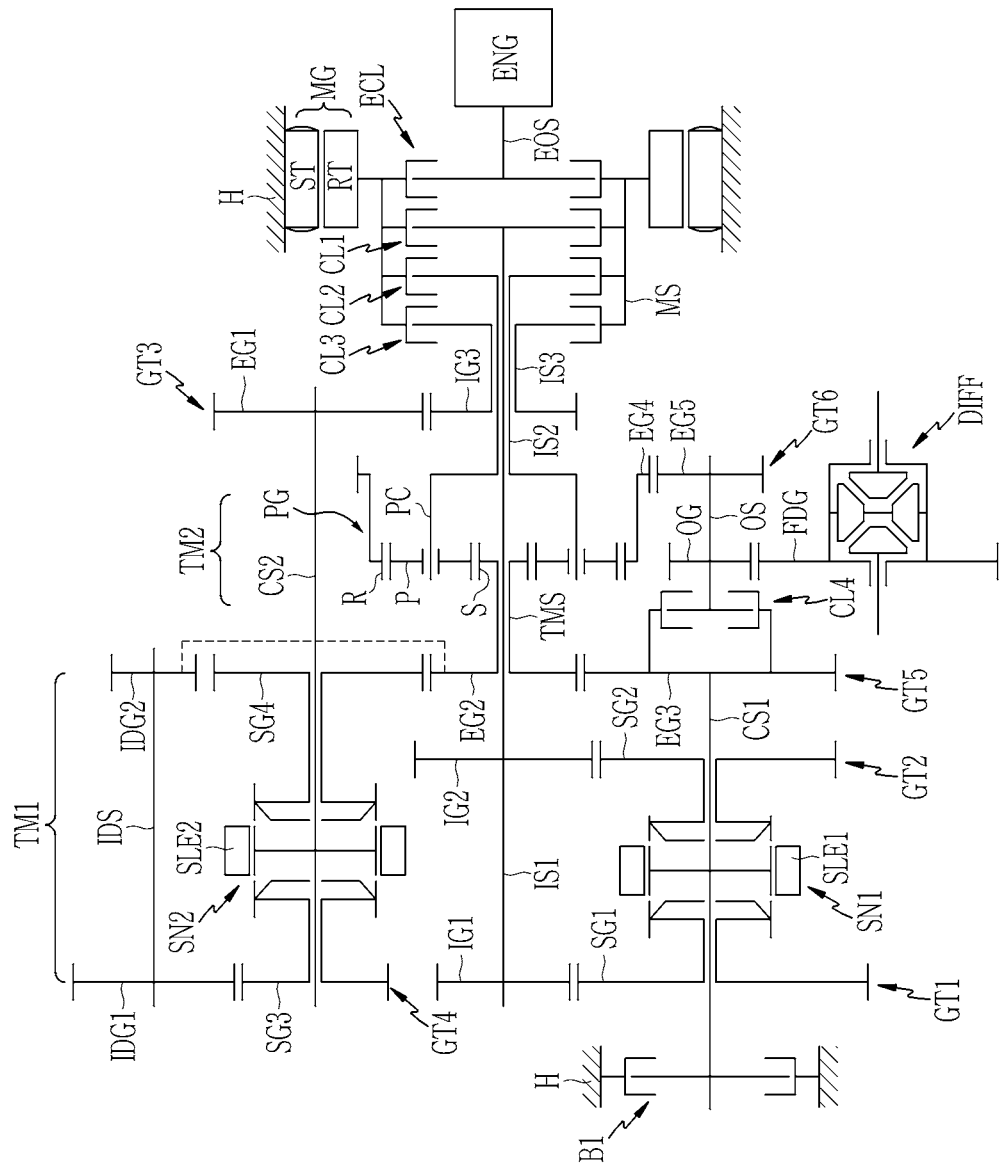
FIG. 7 is a schematic view of a power transmission apparatus configured for a vehicle according to various exemplary embodiments of the present invention.

FIG. 7 is a schematic view of a power transmission apparatus configured for a vehicle according to various exemplary embodiments of the present invention.

Referring to FIG. 7, in various exemplary embodiments in comparison with the various exemplary embodiments of the present invention, the motor/generator MG is mounted backward of the engine ENG, and thus an engine model, a parallel hybrid mode, and an electric vehicle mode (EV mode) may be realized.

The motor/generator MG is mounted coaxial with the engine output shaft EOS, an engine clutch ECL is mounted between the engine output shaft EOS and the motor shaft MS, and the first, second, third clutches CL1, CL2, and CL3 are mounted between the first, second, third input shafts IS1, IS2, and IS3 and the motor shaft MS respectively for selectively connecting the first, second, third input shafts IS1, IS2, and IS3 to the motor shaft MS respectively.

Thus, in the various exemplary embodiments of the present invention, torques of the engine ENG and the motor/generator MG may be selectively transmitted to the first, second, third input shafts IS1, IS2, and IS3 or combined torque of the engine ENG and the motor/generator MG may be transmitted to the first, second, third input shafts IS1, IS2, and IS3 simultaneously.

The various exemplary embodiments only differ from the various exemplary embodiments in the location of the motor/generator MG and adding the engine clutch ECL, providing the same shafting operation and effect, which is therefore not described in further detail.

FIG. 8 is a shifting operation chart for a power transmission apparatus configured for a vehicle according to the various exemplary embodiments of the present invention, and the power transmission apparatus configured for a vehicle according to the various exemplary embodiments performs shifting operation as follows.

[Engine And Parallel Mode Reverse Speed]

In engine and parallel mode reverse speed REV, as shown in FIG. 8, the intermediate shaft CS and the third shifting gear SG3 are synchronously connected by the sleeve SLE2 of the second synchronizer SN2, and the engine clutch ECL and the third and fourth clutches CL3 and CL4 are operated.

As such, a torque of the engine ENG is input to the idle shaft IDS through the engine output shaft EOS, the third input shaft IS3, the third gear set GT3, the second intermediate shaft CS2, the second synchronizer SN2, and the fourth gear set GT4.

And, by the operation of the fourth clutch CL4, the torque of the idle shaft IDS is transmitted to the differential DIFF through the fifth gear set GT5 and the output shaft OS, realizing the engine and parallel mode reverse speed REV.

[Engine And Parallel Mode The First Forward Speed]

In the engine and parallel mode first forward speed FD1, the first intermediate shaft CS1 and the first shifting gear SG1 are synchronously connected by the sleeve SLE1 of the synchronizer SN1, and the engine clutch ECL, the first and fourth clutches are operated.

As such, the torque of the engine ENG is transmitted to the first intermediate shaft CS1 through the engine output shaft EOS, the first input shaft IS1, the first gear set GT1, and the first synchronizer SN1.

And, by the operation of the fourth clutch CL4, the torque of the first intermediate shaft CS1 is transmitted to the differential DIFF through the output shaft OS, realizing the engine and parallel mode first forward speed FD1.

[Engine And Parallel Mode The Second Forward Speed]

In the engine and parallel mode second forward speed FD2, the second intermediate shaft CS2 and the fourth shifting gear SG4 are synchronously connected by the sleeve SLE2 of the second synchronizer SN2, and the engine clutch ECL and the third and fourth clutches CL3 and CL4 are operated.

As such, the torque of the engine ENG is transmitted to the first intermediate shaft CS1 through the engine output shaft EOS, the third input shaft IS3, the third gear set GT3, the second synchronizer SN2, the second intermediate shaft CS2, and the fifth gear set GT5 by the operations of the engine clutch ECL and the third clutch CL3.

By the operation of the fourth clutch CL4, the torque of the first intermediate shaft CS1 is transmitted to the differential DIFF through the output shaft OS, realizing the engine and parallel mode second forward speed FD2.

[Engine And Parallel Mode The Third Forward Speed]

In engine and parallel mode the third forward speed FD3, the second shifting gear SG2 and the first intermediate shaft CS1 are synchronously connected by the sleeve SLE1 of the first synchronizer SN1, and the engine clutch ECL and the first and the fourth clutches CL1 and CL4 are operated.

As such, the torque of the engine ENG is transmitted to the first intermediate shaft CS1 through the engine output shaft EOS, the first input shaft IS1, the second gear set GT2, and the first synchronizer SN1 by the operations of the engine clutch ECL, the first clutch CL1 and the first synchronizer SN1.

By the operation of the fourth clutch CL4, the torque of the first intermediate shaft CS1 is transmitted to the differential DIFF through the output shaft OS, realizing the engine and parallel mode third forward speed FD3.

[Engine And Parallel Mode The Fourth Forward Speed]

In the engine and parallel mode fourth forward speed FD4, the first and second synchronizers SN1 and SN2 are neutral, and the engine clutch ECL and the second and fourth clutches CL2 and CL4 are operated.

The torque of the engine ENG is input to the planet carrier PC of the planetary gear set PG through the second input shaft IS2 by the operations of the engine clutch ECL and the second clutch CL2.

Furthermore, while the planetary gear set PG receives an input torque through the planet carrier PC, the fifth gear set GT5, the first intermediate shaft CS1, the output shaft OS, the sixth gear set GT6, the torque mediating shaft TMS are interconnected by the operation of the fourth clutch CL4. Therefore, the planetary gear set PG forms a closed torque loop between the sun gear S and the ring gear R, and outputs the torque of the planet carrier PC to the differential DIFF through the output shaft OS, realizing the engine and parallel mode fourth forward speed FD4.

[Engine And Parallel Mode The Fifth Forward Speed]

In the engine and parallel mode the fifth forward speed FD5, the second intermediate shaft CS2 and the first shifting gear SG1 are synchronously connected by the operation the sleeve SLE1 of the first synchronizer SN1, and the engine clutch ECL, the first clutch and second clutch CL1 and CL2 are operated simultaneously.

As a result, by the operations of the engine clutch ECL, the first clutch CL1 and the first synchronizer SN1, the torque of the engine ENG partially passes through the first input shaft IS1, the second gear set GT2, the first synchronizer SN1, first the intermediate shaft CS1, and fifth gear set GT5, and is transmitted to the sun gear S of the planetary gear set PG.

Furthermore, by the operation of the second clutch CL2, the torque of the engine ENG partially passes through the second input shaft IS2, and is transmitted to the planet carrier PC of the planetary gear set PG.

As such, the planetary gear set PG forms a shifted torque by a rotation speed difference between the sun gear S and the planet carrier PC, and outputs the shifted toque to the differential DIFF through the output shaft OS, realizing the engine and parallel mode the fifth forward speed FD5.

[Engine And Parallel Mode The Sixth Forward Speed]

In the engine and parallel mode the sixth forward speed FD6, the second intermediate shaft CS2 and the fourth shifting gear SG4 are synchronously connected by the operation of the sleeve SLE2 of the second synchronizer SN2 and the engine clutch ECL, and the second and third clutches CL2 and CL3 are operated simultaneously.

As a result, by the operations of the engine clutch ECL and the second clutch CL2, the torque of the engine ENG partially passes through the second input shaft IS2, and is transmitted to the planet carrier PC of the planetary gear set PG.

Furthermore, by the operation of the third clutch CL3 and the second synchronizer SN2, the torque of the engine ENG partially passes through the third input shaft IS3, the third gear set GT3, the second intermediate shaft CS2, the second synchronizer SN2, and the fifth gear set GT5, and is transmitted to the sun gear S of the planetary gear set PG.

As such, the planetary gear set PG forms a shifted torque by a rotation speed difference between the sun gear S and the planet carrier PC, and outputs the shifted toque to the differential DIFF through the output shaft OS, realizing the engine and parallel mode the sixth forward speed FD6.

[Engine And Parallel Mode The Seventh Forward Speed]

In the engine and parallel mode the seventh forward speed FD7, the first intermediate shaft CS1 and the first shifting gear SG1 are synchronously connected by the operation of the sleeve SLE1 of the first synchronizer SN1 and the engine clutch ECL and the first clutch CL1 and CL2 are operated simultaneously.

As a result, by the operations of the engine clutch ECL, the first clutch CL1 and the first synchronizer SN1, the torque of the engine ENG partially passes through the first input shaft IS1, the first gear set GT1, the first synchronizer SN1, the first intermediate shaft CS1, the fifth gear set GT5, and the torque mediating shaft TMS, and is transmitted to the sun gear S of the planetary gear set PG.

Furthermore, by the operation of the second clutch CL2, the torque of the engine ENG partially passes through the second input shaft IS2, and is transmitted to the planet carrier PC of the planetary gear set PG.

As such, the planetary gear set PG forms a shifted torque by a rotation speed difference between the sun gear S and the planet carrier PC, and outputs the shifted toque to the differential DIFF through the output shaft OS, realizing the engine and parallel mode the seventh forward speed FD7.

[Engine And Parallel Mode The Eighth Forward Speed]

In the engine and parallel mode the eighth forward speed FD8, while the first and second synchronizers SN1 and SN2 are in neutral state, the engine clutch ECL, the second clutch CL2 and the brake B1 are operated simultaneously.

As such, by the operations of the engine clutch ECL and the second clutch CL2, the torque of the engine ENG is transmitted to the planet carrier PC of the planetary gear set PG through the second input shaft IS2, and by the operation of the brake B1 the sun gear S of the planetary gear set PG connected to the brake B1 though the first intermediate shaft CS1, the fifth gear set GT5, and the torque mediating shaft TMS acts as a fixed element.

Furthermore, while the planetary gear set PG receives an input torque through the planet carrier PC, the sun gear S of the planetary gear set PG acts as a fixed element by the operation of the brake BK1. Thus, the planetary gear set PG outputs an increased speed through the ring gear R to the differential DIFF, realizing the engine and parallel mode the eighth forward speed FD8.

[Engine And Parallel Mode The Ninth Forward Speed]

In the engine and parallel mode the ninth forward speed FD9, the second intermediate shaft CS2 and the third shifting gear SG3 are synchronously connected by the sleeve SLE2 of the second synchronizer SN2 and the engine clutch ECL and the second and third clutches CL2 and CL3 are simultaneously operated.

As a result, by the operations of the engine clutch ECL and the second clutch CL2, the torque of the engine ENG partially passes through the second input shaft IS2, and is transmitted to the planet carrier PC of the planetary gear set PG.

Furthermore, by the operation of the third clutch CL3, the torque of the engine ENG partially passes through the third input shaft IS3, the third gear set GT3, the second intermediate shaft CS2, the second synchronizer SN2, the fourth gear set GT4, the idle shaft IDS, and the fifth gear set GT5, and is transmitted to the sun gear S of the planetary gear set PG reversely.

As such, the planetary gear set PG outputs an increased speed though the ring gear R and the output torque of the ring gear R is transmitted through the sixth gear set GT6 and the output shaft OS to the differential DIFF, realizing the engine and parallel mode the ninth forward speed FD9.

That is, the sun gear S reversely rotates and the torque of the engine ENG is input to the planet carrier PC, so that the increased rotation speed than in the eighth forward speed is realized.

In the operation description of the various exemplary embodiments of the present invention, it is assumed that the engine ENG is to be driven as a driving source. However, if the torque of the motor/generator MG is controlled to act as an assist torque, the parallel hybrid mode may be realized.

In the electric vehicle mode (EV mode), after releasing the engine clutch ECL, a vehicle may be driven using the motor/generator MG as a driving source. At the instant time, the shift processes one reverse speed and nine forward speeds are performed in the same manner as the engine and the parallel mode, and therefore, the detailed description is omitted.

The power transmission apparatus configured for a vehicle according to the various exemplary embodiments of the present invention may realize eight forward speeds and one reverse speed by adding one planetary gear set in a dual clutch transmission structure and simplify its internal structure by reducing the number of components, improving fuel economy by minimizing the weight, and improve the mountability by reducing the volume.

The power transmission apparatus configured for a vehicle according to the various exemplary embodiments of the present invention may realize nine forward speeds and one reverse speed by further adding one brake to the power transmission apparatus configured for a vehicle according to the various exemplary embodiments of the present.

The power transmission apparatus configured for a vehicle according to the various exemplary embodiments of the present invention may realize e-CVT mode by further adding one motor/generator to the power transmission apparatus configured for a vehicle according to the various exemplary embodiments of the present.

The power transmission apparatus configured for a vehicle according to the various exemplary embodiments of the present invention may realize the electric vehicle mode and the parallel hybrid mode by changing a position of the motor/generator of the power transmission apparatus configured for a vehicle according to the various exemplary embodiments of the present.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus for a vehicle, the power transmission apparatus comprising:
   a first input shaft selectively connectable to an engine output shaft fixedly connected to an engine;
   a second input shaft formed as a hollow shaft, mounted coaxial with and external to the first input shaft without rotational interference therebetween, and selectively connectable to the engine output shaft;
   a third input shaft formed as a hollow shaft, mounted coaxial with and external to the second input shaft, and selectively connectable to the engine output shaft;
   a torque mediating shaft formed as a hollow shaft and mounted coaxial with and external to the first input shaft without rotational interference therebetween;
   first and second intermediate shafts mounted in parallel with the first input shaft;
   an idle shaft mounted in parallel with the second intermediate shaft;
   a first shifting section including five gear sets engaged to the first and third input shafts, the first and second intermediate shafts, the torque mediating shaft and the idle shaft, wherein the first shifting section is configured of selectively receiving a torque from the first and third input shafts, of shifting the received torque, and of outputting the shifted torque;
   a second shifting section including a planetary gear set having a first rotation element fixedly connected to the torque mediating shaft, wherein the second shifting section is configured of selectively receiving torques from the first shifting section and the second input shaft and outputting shifted torque through one gear set; and
   an output shaft mounted coaxial with and selectively connectable to the first intermediate shaft and outputting a torque from the first and second shifting sections.

2. The power transmission apparatus of claim 1, wherein the five gear sets of the first shifting section include:
   a first gear set including a first input gear fixedly connected to the first input shaft, and a first shifting gear rotatably mounted to the first intermediate shaft and gear-engaged with the first input gear;
   a second gear set including a second input gear fixedly connected to the first input shaft, and a second shifting gear rotatably mounted to the first intermediate shaft and gear-engaged with the second input gear;
   a third gear set including a third input gear fixedly connected to the third input shaft, and a first gear fixedly connected to the second intermediate shaft and gear-engaged with the third input gear;
   a fourth gear set including a third shifting gear rotatably mounted to the second intermediate shaft, and a first idle gear fixedly connected to the idle shaft and gear-engaged with the third shifting gear; and
   a fifth gear set including a fourth shifting gear rotatably mounted to the second intermediate shaft, a second gear fixedly connected to the torque mediating shaft and gear-engaged with the fourth shifting gear, a second idle gear fixedly connected to the idle shaft and gear-engaged with the second gear, and a third gear fixedly connected to the first intermediate shaft and gear-engaged with the second gear.

3. The power transmission apparatus of claim 2, further including:
   a first synchronizer configured for selectively connecting the first shifting gear or the second shifting gear to the first intermediate shaft; and
   a second synchronizer configured for selectively connecting the third shifting gear or the fourth shifting gear to the second intermediate shaft.

4. The power transmission apparatus of claim 2, wherein a gear ratio of the first gear set is used for a first forward speed and a seventh forward speed, wherein a gear ratio of the second gear set is used for a third forward speed and a fifth forward speed, wherein gear ratios of the third and fourth gear sets are used for an eighth forward speed, and wherein gear ratios of the third and fifth gear sets are for a second forward speed and a sixth forward speed.

5. The power transmission apparatus of claim 2, wherein a second rotation element of the planetary gear set is fixedly connected to the second input shaft and a third rotation element of the planetary gear set is gear-engaged with the output shaft through a sixth gear set, and wherein the one gear set is the sixth gear set.

6. The power transmission apparatus of claim 5, wherein the sixth gear set includes:

a fourth gear fixedly connected to the third rotation element of the planetary gear set; and a fifth gear fixedly connected to the output shaft and gear-engaged with the fourth gear.

7. The power transmission apparatus of claim 5, wherein the planetary gear set is a single pinion planetary gear set including a sun gear, a planet carrier and a ring gear as the first rotation element, the second rotation element and the third rotation element, respectively.

8. The power transmission apparatus of claim 1, further includes four clutches.

9. The power transmission apparatus of claim 8, wherein the four clutches include:

a first clutch mounted between the engine output shaft and the first input shaft;

a second clutch mounted between the engine output shaft and the second input shaft;

a third clutch mounted between the engine output shaft and the third input shaft; and a fourth clutch mounted between the first intermediate shaft and the output shaft.

10. The power transmission apparatus of claim 1, wherein the first shifting section and the second shifting section are mounted in series of the second shifting section and the first shifting section from a side of the engine output shaft.

11. The power transmission apparatus of claim 5, further including:

a brake mounted between the first intermediate shaft and a transmission housing.

12. The power transmission apparatus of claim 11, wherein a gear ratio of the first gear set is used for a first forward speed and a seventh forward speed, wherein a gear ratio of the second gear set is used for a third forward speed and a fifth forward speed, wherein gear ratios of the third and fourth gear sets are used for a ninth forward speed and a reverse speed, and wherein gear ratios of the third and fifth gear sets are for a second forward speed and a sixth forward speed.

13. The power transmission apparatus of claim 5, further including:

a brake mounted between the first intermediate shaft and a transmission housing; and a motor/generator gear-engaged with the idle shaft.

14. The power transmission apparatus of claim 13, further including:

a fourth input gear fixedly connected to a motor shaft of the motor/generator and gear-engaged with the second idle gear fixedly mounted on the idle shaft.

15. The power transmission apparatus of claim 14, wherein the fifth gear set further includes the fourth input gear.

16. The power transmission apparatus of claim 15, wherein a gear ratio of the first gear set is used for a first forward speed and a seventh forward speed, wherein a gear ratio of the second gear set is used for a third forward speed and a fifth forward speed, wherein gear ratios of the third and fourth gear sets are used for a ninth forward speed and a reverse speed, and wherein gear ratios of the third and fifth gear sets are for a second forward speed and a sixth forward speed.

17. The power transmission apparatus of claim 5, further including:

a brake mounted between the first intermediate shaft and a transmission housing; and a motor/generator selectively connectable to the engine output shaft.

18. The power transmission apparatus of claim 17, wherein a rotor of the motor/generator is selectively connectable to the engine output shaft through an engine clutch mounted between the rotor and the engine output shaft.

19. The power transmission apparatus of claim 17, wherein a gear ratio of the first gear set is used for a first forward speed and a seventh forward speed, wherein a gear ratio of the second gear set is used for a third forward speed and a fifth forward speed, wherein gear ratios of the third and fourth gear sets are used for a ninth forward speed and a reverse speed, and wherein gear ratios of the third and fifth gear sets are for a second forward speed and a sixth forward speed.

20. The power transmission apparatus of claim 17, wherein a rotor of the motor/generator is selectively connectable to the first, second, and third input shafts through first, second, and third clutches, respectively, wherein the first clutch is mounted between the engine output shaft and the first input shaft, wherein the second clutch is mounted between the engine output shaft and the second input shaft, and wherein the third clutch is mounted between the engine output shaft and the third input shaft.

* * * * *